(12) United States Patent
Martin et al.

(10) Patent No.: US 8,846,806 B2
(45) Date of Patent: Sep. 30, 2014

(54) TREATED FILLERS, COMPOSITIONS CONTAINING SAME, AND ARTICLES PREPARED THEREFROM

(71) Applicant: PPG Industries Ohio, Inc., Cleveland, OH (US)

(72) Inventors: Justin J. Martin, Jeannette, PA (US); Timothy A. Okel, Trafford, PA (US); Raphael O. Kollah, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 13/623,147

(22) Filed: Sep. 20, 2012

(65) Prior Publication Data

US 2013/0079445 A1    Mar. 28, 2013

Related U.S. Application Data

(60) Provisional application No. 61/538,219, filed on Sep. 23, 2011.

(51) Int. Cl.
*C08L 7/00* (2006.01)
*C09C 1/30* (2006.01)
*C09C 1/40* (2006.01)

(52) U.S. Cl.
CPC .............. *C09C 1/405* (2013.01); *C01P 2006/12* (2013.01); *C09C 1/3081* (2013.01); *C01P 2004/64* (2013.01)

USPC ........ 524/575.5; 428/403; 428/404; 428/405; 524/543; 524/570; 524/574

(58) Field of Classification Search
None
See application file for complete search history.

(56) References Cited

U.S. PATENT DOCUMENTS

| | | | |
|---|---|---|---|
| 6,184,408 B1 | 2/2001 | Burns et al. | |
| 6,686,249 B1 * | 2/2004 | Yukinobu et al. | 438/328 |
| 7,569,107 B2 * | 8/2009 | Boyer et al. | 106/481 |
| 7,704,552 B2 | 4/2010 | Okel et al. | |
| 2005/0176852 A1 * | 8/2005 | Okel et al. | 523/216 |
| 2008/0194746 A1 * | 8/2008 | Jiang et al. | 524/261 |
| 2009/0111923 A1 | 4/2009 | Jiang et al. | |
| 2010/0022684 A1 * | 1/2010 | Wallen et al. | 523/334 |

FOREIGN PATENT DOCUMENTS

WO    WO 2006/110424    * 10/2006

* cited by examiner

*Primary Examiner* — Marc Zimmer
(74) *Attorney, Agent, or Firm* — The Webb Law Firm

(57) ABSTRACT

The present invention is directed to a process for producing treated filler including (a) treating a slurry of untreated filler which has not been previously dried, with a treating composition including an organosilane material of specified structure (I); and (b) drying the treated filler slurry. The present invention also is directed to treated filler prepared by the process, as well as rubber compounding compositions and tires including the treated filler.

13 Claims, No Drawings

TREATED FILLERS, COMPOSITIONS CONTAINING SAME, AND ARTICLES PREPARED THEREFROM

CROSS-REFERENCE TO RELATED APPLICATIONS

This application claims the benefit of priority from U.S. Provisional Patent Application No. 61/538,219, filed Sep. 23, 2011, which is incorporated herein by reference in its entirety.

FIELD OF INVENTION

The present invention is related to a process for the preparation of treated filler, treated filler produced by the process, and compositions and articles containing such treated filler.

BACKGROUND OF THE INVENTION

The use of silica/silane filler systems to reduce the rolling resistance and improve the wet traction of passenger car tires is known in the art. A reduction of rolling resistance and, therefore, less fuel consumption also is of import for truck tires.

The simultaneous improvement of rolling resistance, wear and traction, known as expanding the "magic triangle", requires new approaches to rubber composite development. Precipitated silica has played a major role in the emergence of the green tire, which boasts a large improvement in rolling resistance compared to past technologies. The direct cross-linking of silica into a highly cross-linked polymer matrix, while minimizing interactions between silica particles, is believed to be of vital importance to desirable dynamic mechanical properties. In natural rubber, proteins present from its biosynthesis can preferentially adsorb to the silica surface, interfering with the in-situ coupling reaction. Furthermore, increased dump temperatures, which may improve the coupling efficiency, have also been shown to degrade natural rubber.

The U.S. Environmental Protection Agency (EPA), in partnership with the U.S. Department of transportation (DOT) recently announced the first ever fuel economy and greenhouse gas emission standards for medium and heavy duty trucks. The benefits of filling passenger tire tread compounds made from styrene-butadiene rubber (SBR) and/or butadiene rubber (BR) with amorphous precipitated silica have been known as early as 1976. Unfortunately, silica/silane technology has not seen wide adoption in truck tires.

Truck tires are typically produced from natural rubber, which is a biosynthetic latex produced by the rubber tree, *Hervia Brasiliensis*. Solid natural rubber produced by coagulation typically contains some non-rubber components. These components may consist of proteins, lipids, sugars, ash and other impurities it has been proposed that traditional rubber processing methods, in which coupling agent and filler are added independently to the mixer, result in preferential adsorption of proteins onto the silica surface, thereby resulting in incomplete coupling of the silane moieties. Proteins have long been known to adsorb onto silica via strong intermolecular attractions. Further, it has been theorized that there is incomplete coupling of the silica functionality to polymer chain ends in natural rubber because the requisite number of highly reactive pendant 1,2-vinyl groups (which are present in varying amounts in synthetic polymers used in passenger tires) are not present in natural rubber.

Also, the elevated mixing temperatures (in some instances as high as 150° C.) for optimal in-situ coupling of silane to silica has previously been shown to degrade natural rubber.

Accordingly, further improvements in silica/silane technology are desired in order to overcome the above-mentioned deficiencies.

SUMMARY OF THE INVENTION

The present invention is directed to a process for producing treated filler comprising:
(a) treating a slurry comprising untreated filler wherein the untreated filler has not been previously dried, with a treating composition comprising an organosilane of the general formula (I):

$(R_1)_a(R_2)_b SiX_{4-a-b}$        (I)

wherein, in the general formula (I), $R_1$ is independently an organofunctional hydrocarbon comprising 1 to 36 carbon atoms, wherein the functional group of the organofunctional hydrocarbon is vinyl, allyl, hexenyl, epoxy, glycidoxy, (meth)acryloxy, sulfide, isocyanato, polysulfide, mercapto, or halogen; each $R_2$ is independently a hydrocarbon group having from 1 to 36 carbon atoms or hydrogen, X is each independently halogen or alkoxy comprising 1 to 36 carbon atoms; a is 0, 1, 2, or 3; b is 0, 1, or 2; (a+b) is 1, 2, or 3; with the proviso that when b is 1, (a+b) is 2 or 3, to produce a treated filler slurry, and (b) drying said treated filler slurry to produce a treated filler.

The present invention also provides a process for producing treated filler comprising:
(a) combining alkali metal silicate and acid to form a slurry comprising untreated filler wherein said untreated filler has not been previously dried;
(b) treating said slurry with a treating composition comprising an organosilane of the general formula (I) as described above, and
(c) drying said treated filler slurry to produce a treated filler.

The present invention also is directed to treated filler prepared by the process, as well as rubber compounding compositions including the treated filler, and a tire tread comprising the treated filler of the present invention.

DETAILED DESCRIPTION OF THE INVENTION

As previously mentioned, the present invention provides a process for producing treated filler. The process comprises (a) treating a slurry comprising untreated filler wherein said untreated filler has not been previously dried, and drying the treated filler slurry to produce a treated filler. The slurry of untreated filler of (a) is treated with a treating composition comprising an organosilane of the general formula (I):

$(R_1)_a(R_2)_b SiX_{4-a-b}$        (I).

wherein, in the general formula (I), $R_1$ is independently an organofunctional hydrocarbon comprising 1 to 36 carbon atoms, wherein the functional group of the organofunctional hydrocarbon is vinyl, allyl, hexenyl, epoxy, glycidoxy, (meth)acryloxy, sulfide, isocyanato, polysulfide, mercapto, or, as is preferred, halogen; each $R_2$ is independently a hydrocarbon group having from 1 to 36 carbon atoms or hydrogen, X is each independently halogen or, as is preferred, alkoxy comprising 1 to 36 carbon atoms; a is 0, 1, 2, or 3; b is 0, 1, or 2; (a+b) is 1, 2, or 3; with the proviso that when b is 1, (a+b) is 2 or 3. In a particular embodiment of the present invention, the treating composition comprises an organosilane comprising a halo-functional organosilane, wherein X is alkoxy; a is 1; b is 0; and the functional group of the organofunctional hydrocarbon of $R_1$ is halogen.

Generally, in the process of the present invention, alkali metal silicate is combined with aqueous acid solution to form untreated filler slurry; the untreated filler slurry then is treated with a treatment composition comprising an organosilane of general formula (I) as described above, and optionally a treating material, as described herein below, to produce treated filler slurry; and the treated filler slurry then can be dried using conventional drying techniques known in the art to produce a treated filler of the present invention.

As used herein, in the specification and the claims, with reference to filler (i.e., treated and/or untreated), the term "not been previously dried" means filler that, prior to the treatment process, has not been dried to a moisture content of less than 20 percent by weight. For purposes of the present invention, untreated filler does not include filler that has been previously dried to a moisture content of less than 20 percent by weight and then rehydrated.

As used herein and the claims, the term "filler" means an inorganic oxide that can be used in a polymer composition to essentially improve at least one property of said polymer. As used herein and the claims, the term "slurry" means a mixture including at least filler and water.

Suitable untreated fillers for use in process of the present invention can include a wide variety of materials known to one having ordinary skill in the art. Non-limiting examples can include inorganic oxides such as inorganic particulate and amorphous solid materials which possess either oxygen (chemisorbed or covalently bonded) or hydroxyl (bound or free) at an exposed surface, such as but not limited to oxides of the metals in Periods 2, 3, 4, 5 and 6 of Groups Ib, IIb, IIIa, IIIb, IVa, IVb (except carbon), Va, VIa, VIIa and VIII of the Periodic Table of the Elements in Advanced Inorganic Chemistry: A Comprehensive Text by F. Albert Cotton et al, Fourth Edition, John Wiley and Sons, 1980. Non-limiting examples of suitable inorganic oxides can include but are not limited to aluminum silicates, silica such as silica gel, colloidal silica, precipitated silica, and mixtures thereof.

The inorganic oxide can be silica, for example, precipitated silica, colloidal silica, and mixtures thereof. The silica can have an average ultimate particle size of less than 0.1 micron, or greater than 0.001 micron, or from 0.01 to 0.05 micron, or from 0.015 to 0.02 micron, as measured by electron microscope. Further, the silica can have a surface area of from 25 to 1000 square meters per gram, or from 75 to 250 square meters per gram, or from 100 to 200 square meters per gram, as determined by the Brunauer, Emmett, and Teller (BET) method in accordance with ASTM D1993-91.

As previously mentioned, the untreated filler slurry is treated with a treating composition comprising an organosilane of the general formula (I) as described in detail above. A particularly useful organosilane of such structure is a halo-functional organosilane, wherein X is alkoxy, a is 1, b is 0, and the functional group of the organofunctional hydrocarbon of $R_1$ is halogen. For example, the treating composition can comprise a halo-functional organosilane selected from (4-chloromethyl-phenyl) trimethoxysilane, (4-chloromethyl-phenyl)triethoxysilane, [2-(4-chloromethyl-phenyl)-ethyl] trimethoxysilane, [2-(4-chloromethyl-phenyl)-ethyl] triethoxysilane, (3-chloro-propenyl) -trimethoxysilane, (3-chloro-propenyl)-triethoxysilane, (3-chloro-propyl)-triethoxysilane, (3-chloro-propyl)-trimethoxysilane, trimethoxy-(2-p-tolyl-ethyl)silane and/or triethoxy-(2-p-tolyl-ethyl)silane.

Mixtures of any of the aforementioned organosilanes can be used in the process of the present invention.

The organosilane of general formula (I) can be present in the slurry in an amount ranging from 0.25 to 30.0 weight percent, such as 1 to 15 weight percent, or 5 to 10 weight percent based on the total mass of $SiO_2$ which has been precipitated.

In addition to the abovementioned organosilane, the treating composition can further comprise a treating material (i.e., a non-coupling material) chosen from anionic, nonionic and amphoteric surfactants and mixtures thereof, wherein the treating material is present in an amount of from greater than 1% up to and including 25% by weight based on the total mass of $SiO_2$ which has been precipitated. For example, the treating material can be chosen from salts of fatty acids, alkyl sarcosinates, salts of alkyl sarcosinates, and mixtures thereof. Specific non-limited examples of such treating materials can be found in U.S. Pat. No. 7,569,107 at column 5, line 9, to column 7, line 21, the cited portions of which are incorporated by reference herein. In a particular embodiment of the present invention, the treating material comprises one or more anionic surfactants selected from the group consisting of sodium stearate, ammonium stearate, ammonium cocoate, sodium laurate, sodium cocyl sarcosinate, sodium lauroyl sarconsinate, sodium soap of tallow, sodium soap of coconut, sodium myristoyl sarcosinate, and stearoyl sarcosine acid.

The treating material typically is present in an amount of from greater than 1% up to and including 25% by weight, for example 2.0% to 20.0%, or 4%% to 15%, or 5% to 12% by weight based on the total mass of $SiO_2$ that has been precipitated.

The treating composition useful in the process of the present invention also can further comprise a sulfur-containing organosilane different from the aforementioned organosilane used in treating the slurry of step (a). Non-limiting examples of such materials can include but are not limited to organosilanes of the general formula:

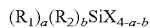

wherein $R_1$ each can be independently an organofunctional hydrocarbon radical comprising 1 to 12 carbon atoms, wherein the organofunctional group is sulfide, polysulfide or mercapto; each $R_2$ can be independently a hydrocarbon group having from 1 to 18 carbon atoms or hydrogen, X each can be independently halogen or alkoxy radical comprising 1 to 12 carbon atoms, a can be 0, 1, 2, or 3, b can be 0, 1, or 2, and a+b can be 1, 2, or 3, with the proviso that when b is 1 then a+b is 2 or 3. The $R_1$ and $R_2$ groups can be selected such that they can react with the polymeric composition in which the treated filler can be used. Additionally, the sulfur-containing organosilane can comprise bis(alkoxysilylalkyl)polysulfides represented by following structural formula:

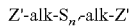

in which "alk" is a divalent hydrocarbon radical having from 1 to 18 carbon atoms; n' is an integer from 2 to 12; and Z' is:

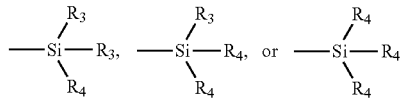

wherein $R_3$ is an alkyl group having from 1 to 4 carbon atoms or phenyl, and $R_4$ is an alkoxy group having from 1 to 8 carbon atoms, a cycloalkoxy group with from 5 to 8 carbon atoms, or a straight or branched chain alkylmercapto group with from 1 to 8 carbon atoms. The $R_3$ and $R_4$ groups can be the same or different. Also, the divalent alk group can be straight or branched chain, a saturated or unsaturated aliphatic hydrocarbon group or a cyclic hydrocarbon group. Non-limiting examples of bis(alkoxysilylalkyl)-polysulfides can include bis(2-trialkoxysilylethyl)-polysulfides in which the trialkoxy group can be trimethoxy, triethoxy, tri(methylethoxy), tripropoxy, tributoxy, etc. up to trioctyloxy and the polysulfide can be either di-, tri-, tetra-, penta-, or hexasulfide, or mixtures thereof. Further non-limiting examples can include the corresponding bis(3-trialkoxysilylpropyl)-, bis(3-trialkoxysilylisobutyl), -bis(4-trialkoxysilylbutyl)-, etc. up to bis(6-trialkoxysilyl-hexyl)-polysulfides. Further non-limiting examples of bis (alkoxysilylalkyl)-polysulfides are described in U.S. Pat. No. 3,873,489, column 6, lines 5-55, and in U.S. Pat. No. 5,580,919, at column 11, lines 11-41. Further non-limiting examples of such corn pounds can include: 3,3-bis(trimethoxysilylpropyl)disulfide, 3,3'-bis(triethoxysilylpropyl)tetrasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, and 3,3'-bis(trioctoxysilylpropyl)tetrasulfide and mixtures thereof.

The sulfur-containing organosilane also can be a mercaptoorganometallic compound represented by the following structural formula:

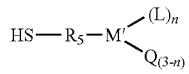

wherein M' is silicon, L is halogen or —$OR_6$, Q is hydrogen, $C_1$-$C_{12}$ alkyl, or halo-substituted $C_1$-$C_{12}$ alkyl, $R_5$ is $C_1$-$C_{12}$ alkylene, $R_6$ is $C_1$-$C_{12}$ alkyl or alkoxyalkyl containing from 2 to 12 carbon atoms, said halogen or (halo) groups being chloro, bromo, iodo or fluoro, and n is 1, 2 or 3. In a non-limiting embodiment, mercaptoorganometallic reactants having two mercapto groups can be used.

Non-limiting examples of useful mercaptoorganometallic compound(s) can include but are not limited to mercaptomethyltrimethoxysilane, mercaptoethyltrimethoxysilane, mercaptopropyltrimethoxysilane, mercaptomethyltriethoxysilane, mercaptoethyltripropoxysilane, mercaptopropyltriethoxysilane, (mercaptomethyl)dimethylethoxysilane, (mercaptomethyl)methyldiethoxysilane, 3-mercaptopropyl-methyldimethoxysilane, and mixtures thereof.

In a particular embodiment of the present invention, the sulfur-containing organosilane can be a mercaptoorganometallic compound such as a mercaptosilane different from the organosilane used in the treating composition of step (a), for example, mercaptopropyltrimethoxysilane and/or mercaptomethyltriethoxysilane.

Also it is contemplated that the sulfur-containing organosilane different from the aforementioned organosilane used in step (a) of the process of the present invention can be a mercaptoorganometallic compound in which the mercapto group is blocked, i.e., the mercapto hydrogen atom is replaced by another group. Blocked mercaptoorganometallic compounds can have an unsaturated heteroatom or carbon bound directly to sulfur via a single bond. Non-limiting examples of specific blocking groups can include thiocarboxylate ester, dithiocarbamate ester, thiosulfonate ester, thiosulfate ester, thiophosphate ester, thiophosphonate ester, thiophosphinate ester, etc. in a non-limiting embodiment wherein a blocked mercaptoorganometallic compound is used as the coupling material, a deblocking agent can be added to the polymeric compound mixture to deblock the blocked mercaptoorganometallic compound. In a non-limiting embodiment wherein water and/or alcohol are present in the mixture, a catalyst, e.g., tertiary amines, Lewis acids or thiols, can be used to initiate and promote the loss of the blocking group by hydrolysis or alcoholysis to liberate the corresponding mercaptoorganometallic compounds. Non-limiting examples of blocked mercaptosilanes can include but are not limited to 2-triethoxysilyl-1-ethyl thioacetate, 3-trimethoxy-silyl-1-propyl thiooctoate, bis-(3-triethoxysilyl-1-propyl)-methyldithiophosphonate, 3-triethoxysilyl-1-propyldimethylthiophosphinate, 3-triethoxysilyl-1-propylmethylthiosulfate, 3-triethoxysilyl-1-propyltoluenethiosulfonate, and mixtures thereof.

The amount of these optional sulfur-containing organosilanes can vary widely and can depend upon the particular material selected. For example, the amount of these optional sulfur-containing organosilanes can be greater than 0.1% based on the weight of untreated filler, such as from 0.5% to 25% based on the weight of untreated filler, or from 1% to 20%, or from 2% to 15%.

In a further embodiment of the present invention, the treating composition also can further comprise a halo-functional organosilane, which comprises a monomeric, dimeric, oligomeric and/or or polymeric compound possessing halogen functionality and alkanedioxysilyl functionality derived from (i) polyhydroxyl-containing compounds in which the alkanedioxy group is covalently bonded to a single Si atom through Si—O bonds to form a ring, and/or (ii) the alkanedioxy groups are covalently bonded to at least two Si atoms through Si—O bonds to form a dimer, oligomer or polymer in which adjacent silyl units are bonded to each other through bridged alkanealkoxy structures. Such halo-functional organosilanes are described in detail in United States Published Patent Application No. 2011/0003922A1, published Jan. 6, 2011, at paragraphs [0020] to [0057], the cited portions of which are incorporated by reference herein.

Further, the treating composition useful in the process of the present invention also may include "non-coupling organosilanes". As used herein, the term "non-coupling organosilane" means an organosilane that serves to compatibilize the treated filler of the present invention with the polymeric composition in which the treated filler ultimately is used. That is, the non-coupling organosilane can affect the free surface energy of the treated filler particles to make the treated filler particles have a surface energy similar to that of the polymeric composition. This facilitates incorporation of the treated filler into the polymeric composition, and can serve to improve (i.e., decrease) mix viscosity of the composition. It should be noted that non-coupling silanes are not expected to couple with the rubber matrix beyond Van der Waal interactions. Some non-limiting examples of such non-coupling silanes include octadecyltriethoxysilane, octadecyltrichlorosilane, octadecyltrimethoxysilane, propyltriethoxysilane, propyltrimethoxysilane, propyltrichlorosilane, n-octyltrimethoxysilane, n-octyltriethoxysilane, n-octyltrichlorosilane, n-hexyltrimethoxysilane, n-hexyltriethoxysilane, and/or n-hexyltrichlorosilane.

It should be understood that for purposes of the present invention, any of the aforementioned organosilanes, including the organosilane having the structure (I) as described above, include partial hydrolyzates thereof.

The treated filler of the present invention can be prepared using any of a variety of methods known to those having ordinary skill in the art. For example, in the instance where treated filler is treated silica, the treated filler is prepared by combining an aqueous solution of soluble metal silicate with acid solution to form a silica slurry; the silica slurry optionally can be aged; acid or base can be added to the optionally aged silica slurry to adjust pH of the slurry; the silica slurry can be filtered, optionally washed, and then dried using conventional techniques known to a skilled artisan. A treatment composition can be added at any step in the above-described process prior to drying.

Further detailed description of the process for forming the treated silica can be found herein below in the Examples.

Suitable metal silicates can include a wide variety of materials known in the art. Non-limiting examples can include but are not limited to alumina, lithium, sodium, potassium silicate, and mixtures thereof. Also, the metal silicate can be represented by the following structural formula: $M_2O(SiO2)x$ wherein M can be alumina, lithium, sodium or, potassium, and x can be an integer from 0.1 to 4.

Suitable acids can be selected from a wide variety of acids known in the art. Non-limiting examples can include but are not limited to mineral acids, organic acids, carbonic acid (carbon dioxide) and mixtures thereof. Sulfuric acid is preferred.

As aforementioned, the treated fillers which are prepared by the process of the present invention are especially suitable for inclusion in organic polymeric compositions, e.g., any organic polymeric composition in which the treated filler advantageously can be included. The treated filler materials prepared by the process of the present invention are especially useful in rubber compounding compositions, and in particular, rubber compositions used in the manufacture of tires and tire components such as tire treads.

Such polymers are described in *Kirk Othmer Encyclopedia of Chemical Technology*, Fourth Edition, 1996, Volume 19, pp 881-904, which description is herein incorporated by reference. The treated filler of the present invention can be admixed with the polymer or the polymerizable components thereof while the physical form of the polymer or polymerizable components is in any liquid or compoundable form such as a solution, suspension, latex, dispersion, and the like. The polymeric compositions containing the treated filler of the present invention may be milled, mixed, molded and cured, by any manner known in the art, to form a polymeric article. Suitable polymers can include but are not limited to thermoplastic and thermosetting resins, rubber compounds and other polymers having elastomeric properties.

The aforementioned polymers can include, for example, alkyd resins, oil modified alkyd resins, unsaturated polyesters, natural oils (e.g., linseed, tung, soybean), epoxides, nylons, thermoplastic polyester (e.g., polyethyleneterephthalate, polybutyleneterephthalate), polycarbonates, i.e., thermoplastic and thermoset, polyethylenes, polybutylenes, polystyrenes, polypropylenes, ethylene propylene co- and terpolymers, acrylics (homopolymer and copolymers of acrylic acid, acrylates, mathacrylates, acrylamides, their salts, hydrohalides, etc.), phenolic resins, polyoxymethylene (homopolymers and copolymers), polyurethanes, polysulfones, polysulfide rubbers, nitrocelluloses, vinyl butyrates, vinyls (vinyl chloride and/or vinyl acetate containing polymers), ethyl cellulose, the cellulose acetates and butyrates, viscose rayon, shellac, waxes, ethylene copolymers (e.g., ethylene-vinyl acetate copolymers, ethylene-acrylic acid copolymers, ethyleneacrylate copolymers), organic rubbers (both synthetic and natural rubbers) and the like.

The amount of treated filler that can be used in a polymeric composition can vary widely depending upon the polymeric composition and the desired properties of the article to be formed from the polymeric composition. For example, the amount of treated filler present in the polymeric composition can range from 5 up to 70 weight %, based on the total weight of the polymeric composition.

In a non-limiting embodiment, the polymeric composition can comprise an organic rubber. Non-limiting examples of such rubbers can include but are not limited to natural rubber; those formed from the homopolymerization of butadiene and its homologues and derivatives such as: cis-1,4-polyisoprene; 3,4-polyisoprene; cis-1,4-polybutadiene; trans-1,4-polybutadiene; 1,2-polybutadiene; and those formed from the copolymerization of butadiene and its homologues and derivatives with one or more copolymerizable monomers containing ethylenic unsaturation such as styrene and its derivatives, vinylpyridine and its derivatives, acrylonitrile, isobutylene and alkyl-substituted acrylates such as methyl methacrylate. Further non-limiting examples can include styrene-butadiene copolymer rubber composed of various percentages of styrene and butadiene and employing the various isomers of butadiene as desired (hereinafter "SBR"); terpolymers of styrene, isoprene and butadiene polymers, and their various isomers; acrylonitrile-based copolymer and terpolymer rubber compositions; and isobutylene-based rubber compositions; or a mixture thereof, as described in, for example, U.S. Pat. Nos. 4,530,959; 4,616,065; 4,748,199; 4,866,131; 4,894,420; 4,925,894; 5,082,901; and 5,162,409.

Non-limiting examples of suitable organic polymers can include copolymers of ethylene with other high alpha olefins such as propylene, butene-1 and pentene-1 and a diene monomer. The organic polymers can be block, random, or sequential and can be prepared by methods known in the art such as but not limited to emulsion (e.g. e-SBR) or solution polymerization processes (e.g., s-SBR). Further non-limiting examples of polymers for use in the present invention can include those which are partially or fully functionalized including coupled or star-branched polymers. Additional non-limiting examples of functionalized organic rubbers can include polychloroprene, chlorobutyl and bromobutyl rubber as well as brominated isobutylene-co-paramethylstyrene rubber. In a non-limiting embodiment, the organic rubber can be polybutadiene, s-SBR and mixtures thereof.

The polymeric composition can be a curable rubber. The term "curable rubber" is intended to include natural rubber and its various raw and reclaimed forms as well as various synthetic rubbers. In alternate non-limiting embodiments, curable rubber can include combinations of SBR and butadiene rubber (BR), SBR, BR and natural rubber and any other combinations of materials previously disclosed as organic rubbers. In the description of this invention, the terms "rubber", "elastomer" and "rubbery elastomer" can be used interchangeably, unless indicated otherwise. The terms "rubber composition", "compounded rubber" and "rubber compound" are used interchangeably to refer to rubber which has been blended or mixed with various ingredients and materials, and such terms are well-known to those having skill in the rubber mixing or rubber compounding art.

Rubber compositions comprising the treated filler produced by the process of the present invention and can be used in the manufacture of a myriad of rubber articles, for example, a tire at least one component of which, e.g., the tread, comprises the cured rubber composition, as well as other rubber articles such as shoe soles, hoses, seals, cable jackets, gaskets, belts, and the like. Rubber compositions comprising the treated filler produced by the process of the present invention are particularly advantageous for use in the manufacture of tire treads exhibiting low rolling resistance and high wear resistance, especially when the tire treads are based on natural rubber. Moreover, it has been observed that lower cure temperatures can be achieved for such natural rubber compositions containing the treated filler produced by the process of the present invention.

The present invention is more particularly described in the following examples, which are intended to be illustrative only since numerous modifications and variations therein will be apparent to those skilled in the art. Unless otherwise specified, all parts and all percentages are by weight.

EXAMPLES

Examples

Part 1 describes the analytical testing performed to determine the physical properties of the silica samples. Part 2 describes the preparation of Example 1 and Comparative Examples 1 and 2 and their characteristic properties reported in Table 1. Part 3 describes the preparation of rubber samples and Comparative Example 3 as reported in Tables 2 and 3. Part 4 describes the testing and physical properties of the rubber samples as reported in Tables 4 and 5.

Part 1—Analytical Testing

The following surface area method uses a cetyltrimethylammonium bromide (CTAB) solution for analyzing the external specific surface area of treated filler according to this invention. The analysis was performed using a Metrohm 751 Titrino automatic titrator, equipped with a Metrohm Interchangeable "Snap-In" 50 milliliter buret and a Brinkmann Probe Colorimeter Model PC 910 equipped with a 550 nm filter. In addition, a Mettler Toledo HB43 was used to determine the moisture loss of the filler and a Fisher Scientific Centrific™ Centrifuge Model 225 for separation of the filler and the residual CTAB solution. The excess TAB was determined by auto titration with a solution of Aerosol® OT surfactant, reported to be sodium sulfosuccinate until maximum turbidity was attained which was detected with the probe colorimeter. The maximum turbidity point was taken as corresponding to a millivolt reading of 150. Knowing the quantity of CTAB adsorbed for a given weight of filler and the space occupied by the CTAB molecule enabled calculation of the external specific surface area of the treated filler which was reported as square meters per gram on a dry-weight basis in Table 2.

Solutions required for testing and preparation included a buffer of pH 9.6, CTAB solution, Aerosol OT surfactant and 1N sodium hydroxide. The buffer solution of pH 9.6 was prepared by dissolving 3.101 g of orthoboric acid (99%; Fisher Scientific, Inc., technical grade, crystalline) in a one-liter volumetric flask, containing 500 milliliter of deionized water and 3.708 g of potassium chloride solids (Fisher Scientific, Inc., technical grade, crystalline). Using a buret, 36.85 milliliter of the 1N sodium hydroxide solution was added. The solution was mixed and diluted to volume. The CTAB solution was prepared using 11.0 g of the powdered CTAB, Fisher Scientific Inc., technical grade) onto a weighing dish. The CTAB powder was transferred to a 2-liter beaker, rinsing the weighing dish with deionized water. Approximately 700 milliliter of the pH 9.6 buffer solution and 1000 milliliter of distilled or deionized water was added into the 2-liter beaker and stirred with a magnetic stir bar. A large watch glass was placed on the beaker and the beaker was stirred at room temperature until the CTAB was totally dissolved. The solution was transferred to a 2-liter volumetric flask rinsing the beaker and stir bar with deionized water. The bubbles were allowed to dissipate, and diluted to volume with deionized water. A large stir bar was added and mixed on a magnetic stirrer for approximately 10 hours. The (Aerosol OT® surfactant Fisher Scientific Inc., 100% solid) solution was prepared using 3.46 g onto a weighing dish. The Aerosol® OT was rinsed into a 2 liter beaker which contained about 1500 milliliter deionized water and a large stir bar. The Aerosol® OT solution was dissolved and rinsed into a 2-liter volumetric flask. The solution was diluted to 2-liter volume mark in the volumetric flask. The Aerosol® OT solution was allowed to age for a minimum of 12 days prior to use was used prior to the expiration date of 2 months from the preparation date.

Prior to surface area sample preparation, the pH of the CTAB solution was verified and adjusted to a pH of 9.6±0.1 using 1N sodium hydroxide solution. For test calculations a blank sample was prepared and analyzed. 5 milliliters CTAB solution was pipetted and 55 milliliters deionized water was added into a 150-milliliter beaker and analyzed on a Metrohm 751 TITRINO® automatic titrator. The automatic titrator was programmed for determination of the blank and the samples with following parameters: Measuring point density=2, Signal drift20, Equilibrium time=20 seconds, Start volume=0 ml, Stop volume35 ml, and Fixed endpoint150 mV. The buret tip and the colorimeter probe were placed just below the surface of the solution, positioned such that the tip and the photo probe path length were completely submerged. Both the tip and photo probe were essentially equidistant from the bottom of the beaker and not touching one another. With minimum stirring (setting of 1 on the Metrohm 728 stirrer) the colorimeter was set to 100% T prior to every blank and sample determination and titration was initiated with the Aerosol® OT solution. The end point was recorded as the volume (mL) of titrant at 150 mV.

For test sample preparation, approximately 0.30 grams of powdered filler was weighed into a 50-milliliter container with a stir bar. The pH adjusted CTAB solution (30 milliliters) was pipetted into the sample container with the 0.30 grams of powdered filler. The filler and CTAB solution was then mixed on a stirrer for 35 minutes. When mixing as completed, the filler and CTAB solution was centrifuged for 20 minutes to separate the filler and excess CTAB solution. When centrifuging was completed, the CTAB solution was pipetted into a clean container minus the separated solids, referred to as the "centrifugate". For sample analysis, 50 milliliters of deionized water was placed into a 150-milliliter beaker with a stir bar. 10 milliliters of the sample centrifugate was pipetted for analysis into the same beaker. The sample was analyzed using the same technique and procedure described herein.

For determination of the moisture content, approximately 0.2 grams of silica was weighed onto the Mettler Toledo HB43 while determining the CTAB value. The moisture analyzer was programmed to 105° C. with the shut-off 5 drying criteria. The moisture loss was recorded to the nearest +0.1%. The external surface area was calculated using the following equation, $$CTAB \text{ Surface Area (dried basis) } [m^2/g] = \frac{(2V_o - V) \times (4774)}{(V_o W) \times (100 - Vol)}$$

wherein,
Vo=Volume in ml of Aerosol OT® used in the Blank titration.
V=Volume in ml of Aerosol OT® used in the sample titration.
W=sample weight in grams.
Vol=% moisture loss (Vol represents "volatiles")

The BET surface area values reported in the examples of this application were determined in accordance with the Brunner-Emmet-Teller (BET) method in accordance with ASTM D 1993-91. The determination of the weight percent carbon for treated silicas was performed on a Flash 2000 elemental analyzer. This system was set up to only monitor carbon. Typical parameters included: the combustion oven being set to 1060° C., the GC oven temperature being set to 60° C., the carrier gas flow rate being set to 140 mL/min and oxygen injection time of 15 seconds. For a given run, calibration standards, samples, controls and check standards were typically run. The sample size was between 1-3 mg and they were sealed in tin capsules prior to analysis. If the control sample or the known standard control sample was not within ±0.5% relative of the known accepted value or the samples run in duplicate do not match (±0.6% relative), the entire sample run was reanalyzed.

The weight percent methanol in silica was determined using a Hewlitt Packard 7890 gas chromatogram with auto sampler. An Rxi-624Sil MS, 30 m×0.32 mm with 1.8 μm film thickness column was used for the analysis. The injection port was set to 200° C. and an injection volume of 2.0 μL was used. The detector was a flame ionization detector. A calibration standard was prepared by diluting methanol in acetonitrile. To prepare the silica samples for analysis, 1 gram of silica was dispersed in 10 to 20 mL acetonitrile depending on methanol content. Less diluent solvent was used when the amount of methanol was not expected to be large. The mixture was centrifuged at 19000 RPM for 33 minutes. Only the liquid portion was analyzed by injecting it directly into the chromatogram.

$Na_2O$ Titration:
1. Pipette 20 ml of the sample to be tested.
2. Discharge contents of the pipette into a beaker equipped with a magnetic stir bar.
3. Dilute the sample in the beaker with roughly 100 ml of deionized water.
4. Place the beaker on a magnetic stir plate and agitate the sample moderately.
5. Add approximately 10 drops of Methyl Orange-Xylene Cyanole indicator. The color of the solution in the beaker should be green.
6. Titrate with 0.645N HCl from a 50 ml burette. End of titration will be indicated when the color of the solution turns purple.
7. Read the milliliters of 0.645N HCl added. This value is the grams per liter of Na2O in the sample.

Acid Value Titration:
1. Pipette 50 ml of the reactor contents.
2. Discharge the contents of the pipette into a beaker equipped with a magnetic stir bar.
3. Dilute the sample in the beaker with roughly 100 ml of deionized water.
4. Place the sample on a magnetic stir plate and agitate moderately.
5. Add approximately 6 drops of phenolphthalein indicator. The color of the solution in the beaker should be pink.
6. Titrate with 0.645N HCl from a 50 ml burette. End of titration will be indicated when the color of the solution turns clear.
7. Read the milliliters of 0.645N HCl added.

8. $\text{Acid value} = \frac{(\text{ml of } 0.645N \text{ HCl}) * (64.5)}{50}$

Part 2—Preparation of Example 1 and Comparative Examples 1 and 2
Precipitation Equipment Used The reactor was a round bottom 150 liter stainless steel tank. The tank had two 5 cm baffles placed vertically on opposite sides of the inside of the tank for added mixing. Heating was via steam coils located 46.4 cm down from the top of the tank. The tank had two agitators. Main agitation was accomplished via an EKATO® MIG style blade and a secondary high speed agitator was used for acid addition with a cowles style blade turning at 1750 RPM. The secondary high speed agitator was only run when acid was being added to the tank.

Raw Materials Used
Sodium silicate—80 g/l Na2O with a $SiO_2/Na_2O$ ratio of 3.2
Sulfuric acid—96%, 36 N Example 1

Water (74.1 liters) was added to the 150 L reactor tank and heated to 87° C. via indirect steam coil heat. Sodium silicate (2.5 L) was added at a rate of 553 mL/min to achieve an $Na_2O$ concentration of 2.6 g/L and an acid value of 7.8. The $Na_2O$ concentration and acid value were confirmed by titrating the sodium silicate/water mixture using the $Na_2O$ titration method and acid value titration method described above. The temperature was adjusted as necessary to 87° C. via indirect steam coil heating and the precipitation step was initiated. The 150 liter reactor was agitated via the main tank agitator.

The main agitator was left on and a simultaneous addition precipitation step was started. 50.0 liters of sodium silicate and 3.7 liters of sulfuric acid were added simultaneously over a period of 90 minutes. The sodium silicate was added via an open tube near the bottom of the tank at a rate of 553 ml/min and the sulfuric acid was added directly above the secondary high speed mixer blades. The acid addition rate averaged 41.0 ml/min over the course of the 90 minute simultaneous addition step.

At the end of the simultaneous addition step, a 100 minute age step was initiated. The pH of the solution was adjusted to 8.5 using sulfuric acid. The secondary high speed agitator was turned off. 1.4 L of p-(chloromethyl)phenyl trimethoxysilane, 75% (Gelest) was added subsurface via an open tube positioned about halfway down the tank at a rate of 460 mL/min. After the completion of the silane addition, the agitation was increased to 162 RPM on the main agitator. 735.4 g of sodium stearate was sprinkled into the reactor slowly over the course of 15-20 minutes. The reaction mixture completed ageing under stirring for the remainder of the 100 minutes. The temperature was maintained at 87° C.

After the age step was completed, sulfuric acid was added to reach a final batch pH of 4.5. The mixture was pumped into a filter press and washed until the conductivity of the rinse water measured less than 1000 microsiemens. The resulting filter cake was reslurried with water to form a pumpable slurry and spray dried using a Niro spray drier (Utility Model 5 with Type FU-11 rotary atomizer, Niro Inc.). The spray dried powder was granulated using an Alexanderwerk WP120X40 Roller Compactor with the following conditions: screw speed=55 rpm, roller speed 4.5 rpm, crusher speed=55 rpm, hydraulic pressure=25 bar and screen size=7 mesh.

Comparative Example 1

A precipitated silica possessing a BET surface area of approximately 175 $m^2/g$ and a CTAB surface area of approximately 153 $m^2/g$, was added to an 8 quart Patterson Kelley V-blender equipped with an intensifier bar. The blender was started and the intensifier bar was initiated as 193 grams of p(chloromethyl)phenyl trimethoxysilane, 75% (Gelest) was added directly into the intensifier through an addition tube and was gravity fed from a plastic funnel. The intensifier bar was allowed to continue for approximately two minutes after all of the silane had been added. The V-blender continued to blend for approximately 45 minutes after all of the silane had been added. The material was poured into a plastic bag and used within five days. No sodium stearate was used for this example due to the insolubility of the material and rapid hardening that has been observed to occur inside the intensifier bar.

The treated powder was granulated using an Alexanderwerk WP120X40 Roller Compactor with the following conditions: screw speed=55 rpm, roller speed 4.5 rpm, crusher speed=55 rpm, hydraulic pressure=25 bar and screen size=7 mesh.

Comparative Example 2

Water (74.9 liters) was added to the 150 L reactor tank and heated to 70° C. via indirect steam coil heat. Sodium silicate (2.5 L) was added at a rate of 559 mL/min to achieve an Na$_2$O concentration of 2.6 g/L and an acid value of 7.8. The Na$_2$O concentration and acid value were confirmed by titrating the sodium silicate/water mixture using the Na$_2$O titration method and acid value titration method described above. The temperature was adjusted as necessary to 70° C. via indirect steam coil heating and the precipitation step was initiated. The 150 liter reactor was agitated via the main tank agitator.

The main agitator was left on and a simultaneous addition precipitation step was started. Sodium silicate (50.3 liters) and 3.2 liters of sulfuric acid were added simultaneously over a period of 90 minutes. The sodium silicate was added via an open tube near the bottom of the tank at a rate of 559 ml/min and the sulfuric acid was added directly above the secondary high speed mixer blades. The acid addition rate averaged 36.0 ml/min over the course of the 90 minute simultaneous addition step.

At the end of the simultaneous addition step, a 100 minute age step was initiated. The pH of the solution was adjusted to 8.5 using sulfuric acid. The secondary high speed agitator was turned off. 0.79 L of gamma-mercaptopropyltriethoxysilane, was added subsurface via an open tube positioned about halfway down the tank at a rate of 39 mL/min. After the completion of the silane addition, the agitation was increased to 162 RPM on the main agitator. Sodium stearate (1244 g) was sprinkled into the reactor slowly over the course of 15-20 minutes. The reaction mixture completed ageing under stirring for the remainder of the 100 minutes. The temperature was maintained at 70° C. After the age step was completed, sulfuric acid was added to reach a final batch pH of 4.8.

The mixture was pumped into a filter press and washed until the conductivity of the rinse water measured less than 1000 microsiemens. The resulting filter cake was reslurried with water to form a pumpable slurry and spray dried using a Niro spray drier (Utility Model 5 with Type FLI-11 rotary atomizer, Niro Inc.). The spray dried powder was granulated using an Alexanderwerk WP120X40 Roller Compactor with the following conditions: screw speed=55 rpm, roller speed 4.5 rpm, crusher speed=55 rpm, hydraulic pressure=25 bar and screen size=7 mesh. The physical properties of the synthesized silicas are summarized in Table 1.

TABLE 1

| Example # | BET (m$^2$/g) | CTAB (m$^2$/g) | % carbon | Approx silane treatment level (wt. % silica) | Approx surfactant treatment (wt. % silica) | Free Methanol (wt. % silica) |
|---|---|---|---|---|---|---|
| 1 | 84.0 | 127.0 | 6.2 | 12.0 | 5.50 | <0.01 |
| CE-1 | 118.0 | 106.0 | 5.1 | 12.0 | 0.0 | 1.68 |
| CE-2 | 124.0 | 183.0 | 5.0 | 5.8 | 9.20 | Not tested |

Part 3 Preparation of the Rubber Samples and Comparative Example 3

A Standard Compounding Protocol was used to prepare test samples of formulated rubber compositions containing the silica of the Examples and Comparative Examples (CE). Comparative Example 3 was prepared by adding a granulated precipitated silica possessing a BET surface area of approximately 157 m$^2$/g and a CTAB surface area of approximately 158 m$^2$/g to the mixer as well as p-(chloromethyl)phenyl trimethoxysilane at the doses and times prescribed in Table 2 and 3.

The following ingredients in amounts of parts per hundred parts of rubber by weight (phr) were added in the order described to a polyethylene bag held erect in a 500-milliliter (mL) plastic cup.

TABLE 2

| Material | Amount (phr) |
|---|---|
| Processing oil [1] | 5.0 |
| Zinc oxide [2] | 4.0 |
| Antiozonant [3] | 2.5 |
| Stearic acid [4] | 2.0 |
| Antidegradent [6] | 2.0 |
| Antiozonant wax [7] | 1.0 |
| The remaining materials were weighed and added to a paper cup | |
| Test Silica Filler | 58-60 |
| Carbon Black N-220 [5] | 3.0 |
| Silane (if not pre-reacted) | 8 |

[1] Vivatec 500 aromatic hydrocarbon processing oil, obtained commercially from the H&R Group.
[2] KADOX ® surface treated zinc oxide, obtained commercially from Zinc Corporation of America.
[3] SANTOFLEX ® 13 (6-PPD), reported to be n-(1,3-dimethylbutyl)-N'-phenyl-p-phenylenediamine and 4-aminodiphenylamine from Flexsys.
[4] Rubber grade stearic acid, obtained commercially from C. P. Hall.
[5] Nano grade carbon black from Sid Richardson Carbon and Energy Company.
[6] STANGARD ® TMQ distributed by Harwick Standard.
[7] SUNPROOF ® Improved from Chemtura A 1.89 liter (L) Kobelco internal mixer (Model "BR00") was used for mixing the various ingredients. Immediately prior to adding the batch ingredients to the mixer, 800 grams (g) of CV-60 grade natural rubber was put through the mixer to clean it of any residue of previous runs and increase the temperature to about 93° C. (200° F.). After removing the rubber, the mixer was cooled to about 65° C. (150° F.) before adding the ingredients to produce the rubber test sample.

A rubber composition was prepared using the test filler, the following other enumerated ingredients and the procedure described hereinafter.

TABLE 3

| Ingredient | Amount (phr) | Time at which material was added to or ((removed from)) mixer in minutes | Rotor speed (rpm) |
|---|---|---|---|
| First Pass | | | |
| SMRL[8] | 100.0 | 0 | 30 |
| Carbon Black N-220[5] | 3.0 | 0 | 30 |
| Test Silica Filler | 29-30 | 1.0 | 30 |
| Test Silica Filler | 29-30 | 2.0 | 30 |
| Processing oil[1] | 5.0 | 2.0 | 30 |
| SPEED CHANGE | All | 3.0 | 90 |
| Dump contents | | ((5.0)) | |
| Second Pass | | | |
| Product of First Pass | All | 0 | 60 |
| Zinc Oxide[2] | 4.0 | 1 | 60 |
| Stearic Acid[4] | 2.0 | 1 | 60 |
| Antiozonant[3] | 2.5 | 1 | 60 |
| Antidegradent[6] | 2.0 | 1 | 60 |
| Antiozonant wax[7] | 1.0 | 1 | 60 |
| SPEED CHANGE | | 2 | 90 |
| Dump contents | | ((5.0)) | |
| Mill Finish | | | |
| Product of second pass | All | 0 | |
| RM Sulfur[9] | 2.0 | 1 | |
| CBS[10] | 3.0 | 1 | |
| DPG[11] | 0.5 | 1 | |
| REMOVE FROM MILL | | ((5)) | |

[8]Standard Malaysian Rubber Light, Clarimer L from Akrochem,
[9]Rubbermaker's sulfur, Harwick Standard
[10]N-Cyclohexyl-2-Benzothiazolesulfenamide, Harwick Standard
[11]N,N'-Diphenyl guanidine, Harwick Standard The first pass was initiated by adding the rubber, to the mixer and mixing at 30 rpm. The rotor speed was maintained at 30 rpm and 3.0 phr carbon black was added. After one minute, half of the test filler was added with the remainder being added one minute later. The Vivatec 500 was added with the second part of test filler. At three minutes, the ram was raised and the chute swept, i.e., the covering on the entry chute was raised and any material that was found in the chute was swept back into the mixer. The speed of the mixer was increased to 70 RPM. The contents in the mixer were mixed for an additional two minutes to achieve a maximum temperature in the range of from 145 to 150° C. (293 to 302° F.) and to complete the first pass in the mixer. Depending upon the type of sample, the rotor speed of the mixer may be increased or decreased after 4 minutes to achieve a temperature in the foregoing range within the specified mixing period. The material was removed from the mixer.

After completing the first pass, the removed material was weighed and sheeted in a Farrel 12 inch, two-roll rubber mill at 2.032 mm±0.127 mm (0.080 inch±0.005 inch). The resulting milled stock was used for the second pass in the mixer.

The second pass was initiated by adding the first pass stock to the mixer operating at 60 rpm. After one minute, the pre-weighed zinc oxide, stearic acid, SANTOFLEX® 13 antiozonant, STANGARD® TMQ antidegradent and SUNPROOF® Improved antiozonant wax were added to the mixer. After an additional minute, the ram was raised and the chute swept. The mixing speed was decreased to 30 RPM. The second pass was completed by mixing the stock an additional 3.0 minutes while maintaining the temperature at or below 135° C. (257° F.) to 140° C. (284° F.).

A Farrel 12 inch, two-roll rubber mill was heated to approximately 60° C. (140° F.). The stock from the second pass of Part B was fed into the running mill with a nip setting of 2.032 mm±0.127 mm (0.080 inch±0.005 inch). The RM sulfur, CBS and DPG were added to the mill and blended together. The total mill time was about five minutes with 5 side cuts and 5 end rolls. The resulting sheet was placed on a flat surface until the temperature of the sheet reached room temperature. Typically, the sheet cooled within about 30 minutes. The sheet stock collected of the mill was placed on a flat clean surface. Using a stencil, a rectangular sample 203.2 mm×152.4 mm (8 inches×6 inches) was cut from the sheet stock. The sample was conditioned, i.e., stored between clean polyethylene sheets and maintained for 15 to 18 hours at a temperature of 23±2° C., and a relative humidity of 50%±5%.

After conditioning, the sample was placed in a 203.2 mm×152.4 mm×2,286 mm (8 inches×6 inches×0.09 inch) standard frame machine steel compression mold having a polished surface. The sample was cured in a 61 centimeter×61 centimeter (24 inches×24 inches) 890 kilonewton (100 ton) 4-post electrically heated compression press, for T90, i.e., the time it takes for 90 percent of the cure to occur, in accordance with ASTM D-2084, plus 5 minutes at 150° C. (302° F.) under a pressure of 13.79 megapascals (2000 pounds per square inch). Typically, curing was completed within about 10 minutes. The resulting cured rubber sheet was removed from the mold and maintained for 15 to 18 hours at a temperature of 23°±2° C. (73.4±3.6° F.), and a relative humidity of 50%±5% prior to testing as follows.

Part 4 —Testing of the Cured Rubber Products

Testing was performed in accordance with ASTM D 412-98a—Test Method A. Dumbbell test specimens were prepared using Die C. An matron model 4204 with an automated contact extensiometer for measuring elongation was used. The cross-head speed was found to equal 508 mm/min. All calculations were done using the Series IX Automated Materials Testing software supplied by the manufacturer.

Milled and sheeted rubber from Part 3 was used to determine Mooney viscosity, Rheometrics dynamic data, and TS2 and TS50. Mooney viscosity (ML 1+4) was determined using a Mooney Viscometer (MV 2000) with a large rotor in accordance with ASTM D 1646-00 part A. MDR 2000 related data (TS2, TC50, and TC90) was determined using a Moving Die Rheometer (MDR 2000) in accordance with ASTM D 5289-95 (2001).

Rheometrics Dynamic Data (temperature and strain sweep) was determined under parallel plate conditions on a Rheometrics Dynamic Spectrometer 2 (RDS 2). A compounded elastomer sample, that was cured between two parallel plates, was subjected to an oscillatory strain to evaluate viscoelastic properties such as elastic modulus (G'), viscous modulus (G"), and damping (tangent delta=G"/G'). Temperature Sweeps were done between −45° C. to 75° C. at 1 Hz and 2% strain. Strain sweeps were done between 0.1-20% Strain at 1 Hz and 30° C.

The specimen for Rheometrics Dynamic Data was prepared from a portion of milled and sheeted processed rubber which was re-milled to 0.450-in. thickness. A 2-inch by 2-inch block was cut from the sheet. Two cylindrical specimens, 11 mm in diameter, were then cut from the block using an 11-mm punch and a die clicker. The punched rubber specimens were trimmed to 0.86+0.01 grams. The specimens were placed in a 11 mm diameter cavity in a compression mold between parallel plates that were machined aluminum cylinders with a raised cylindrical platform. The parallel plates had a total thickness of 0.188 inches and a diameter of 0.985 inches. The raised cylindrical platform portion of the parallel plates had a thickness of 0.125 inches and a diameter of 0.793 inches. The plates were previously cleaned with acetone and primed with Chemlok 205. The specimens were cured at 150° C. for T90 plus 10 minutes under 15 tons of pressure.

Thin sheets were used to test Stress/strain. Stress/Strain testing was performed in accordance with ASTM 412-98a—Test Method A. Dumbbell test specimens were prepared using Die C. An Instron model 4204 with an automated contact extensiometer for measuring elongation was used. The cross-head speed was 508 mm/min. AU calculations were done using the Series IX Automated Materials Testing software supplied by the manufacturer.

Circular samples 12 mm high and 29 mm in diameter were used to test Zwick rebound, DIN abrasion, and dispergrader white area. Zwick rebound was determined using a Zwick 5109 Rebound Resilience Tester in accordance with ASTM D 1054-91 (2000). DIN (abrasion resistant) Index was determined following method B in accordance with ASTM D 5963-97A (2001).

Dispergrader % white area was determined using a Disper-Grader 1000 NT+ (100×). A computer-controlled optical instrument captured the images of the topography of the surface of a freshly-cut cured rubber sample. Undispersed untreated or treated or coupling filler particles were manifested as "bumps" or "divots" in the topography. Image analysis software measured the size of each feature within a field of view of 40 microns×35 microns at a magnification of 100×. The diameters and numbers of particles were grouped into various size ranges and the area % was calculated. The software allowed for the comparison of the treated or coupling or untreated filler dispersion to internal libraries of reference photographs. Table 4 details the amount of carbon black in the Carbon Black Control and the samples, the amounts of silica based filler loading and the amount of silane added to Comparative Example 3 (CE-3). The type of carbon black used was grade N220. CE-3 represents a "drop in" comparative in which Hi-Sil™ HDS was the silica and of p-(chloromethyl) phenyl trimethoxysilane, 75% (Gelest) were added to the mix to form the rubber. Table 5 shows a summary of the properties associated with the silica filled rubber products.

TABLE 4

| Loading (phr) | Carbon Black Control Rubber | Example 1 Rubber | CE-1 Rubber | CE-2 Rubber | CE-3 Rubber |
|---|---|---|---|---|---|
| Carbon Black | 50 | 3 | 3 | 3 | 3 |
| Silica | 0 | 60 | 58 | 60 | 58 |
| Silane | 0 | 0 | 0 | 0 | 6 |

TABLE 5

| | Carbon Black Control | EX-1 | CE-1 | CE-2 | CE-3 |
|---|---|---|---|---|---|
| Finished Properties | | | | | |
| Mooney Viscosity (ML 1 + 4) | 59.0 | 49.0 | 57.0 | 66.2 | 83.0 |
| Scorch Time, TS2, minutes | 5.4 | 6.5 | 7.3 | 3.6 | 5.9 |
| Cure Time, $T_C 90$, minutes | 9.5 | 10.2 | 13.16 | 5.7 | 12.0 |
| Cured Properties | | | | | |
| % Dispersion | 95.0 | 96.0 | 99.0 | 99.2 | 83.0 |
| Elongation % | 512.0 | 494.0 | 523.5 | 580.0 | 386.0 |
| DIN Loss | 130.0 | 131.0 | 146.0 | 154.0 | 129.0 |
| Heat Buildup ° C. | 20.0 | 11.0 | 15.0 | 14.0 | 16.0 |
| G' @ 1% strain | 3.8 | 2.9 | 3.0 | 5.1 | 2.9 |
| tan δ @60° C. | 0.121 | 0.040 | 0.058 | 0.076 | 0.055 |

Example 1 demonstrated a lower mixing viscosity, i.e., Mooney viscosity (ML 1+4) when compared to the Control and all of the Comparative Examples. The cure time of Example 1, as indicated by Tc90, was comparable to the Carbon Black Control and less than CE-1 and CE-3. CE-2, which incorporated a mercaptosilane, was expected to provide a faster cure time. Percent dispersion as indicated by dispsrgrader analysis showed that Example 1 demonstrated comparable dispersion properties to the Carbon Black Control. Example 1 also demonstrated greater crosslink densities ($S'_{max}-S'_{min}$) when compared to the Carbon Black Control at similar elongation. Example 1 demonstrated the lowest heat build-up and rolling resistance (tan δ@60° C.) when compared to the Carbon Black Control as well as CE-1; CE-2 and CE-3. When compared to CE-2, EX-1 shows an increase in scorch time or the working time before the material begins to stiffen. It is generally desirable to have a balance between cure time and scorch safety such that the material can be processed before stiffening, but not adversely affecting productivity due to long cure times. EX-1 shows a nice balance of properties, similar to carbon black, which tire companies will have familiarity using.

Although the present invention has been described with references to specific details of certain embodiments thereof, it is not intended that such details should be regarded as limitations upon the scope of the invention except in so far as they are included in the claims.

We claim:
1. A process for producing treated filler comprising:
(a) treating a slurry comprising untreated filler, wherein said untreated filler has not been previously dried, with a treating composition comprising (i) an organosilane selected from the group consisting of (4-chloromethyl-phenyl) trimethoxysilane, (4-chloromethyl-phenyl) triethoxysilane, [2-(4-chloromethyl-phenyl)-ethyl] trimethoxysilane, [2-(4-chloromethyl-phenyl)-ethyl] triethoxysilane, (3 -chloro-propenyl)-trimethoxysilane, (3 -chloro-propenyl)-triethoxysilane, (3 -chloro-propyl)-triethoxysilane, (3 -chloro-propyl)-trimethoxysilane, trimethoxy-(2-p-tolyl-ethyl)silane, triethoxy-(2-p-tolyl-ethyl)silane, and mixtures thereof; and (ii) a mercaptosilane, and
(b) drying said treated filler slurry to produce treated filler.
2. The process of claim 1, wherein the mercaptosilane comprises mercaptopropyltrimethoxysilane.
3. The process of claim 1, wherein the treating composition further comprises a treating material chosen from anionic, nonionic and amphoteric surfactants and mixtures thereof, wherein the treating material is present in an amount of from greater than 4% to 15% by weight of untreated filler.
4. The process of claim 1, wherein said untreated filler is chosen from aluminum silicate, silica gel, colloidal silica, precipitated silica, and mixtures thereof.
5. The process of claim 4, wherein the filler comprises precipitated silica.
6. A treated filler material produced by the process of claim 1.
7. A rubber composition comprising the treated filler produced by the process of claim 1.
8. A rubber article comprising the treated filler produced by the process of claim 1.
9. A tire tread comprising the treated filler produced by the process of claim 1.
10. The process of claim 1, wherein the untreated filler is chosen from aluminum silicate, silica gel, colloidal silica, precipitated silica, and mixtures thereof.
11. The process of claim 10 wherein the filler is precipitated silica.

12. A natural rubber composition comprising the treated filler produced by the process of claim 1.

13. A natural rubber composition comprising the treated filler produced by the process comprising:

(a) treating a slurry comprising untreated filler, wherein said untreated filler has not been previously dried, with a treating composition comprising (i) an organosilane selected from the group consisting of (4-chloromethyl-phenyl) trimethoxysilane, (4-chloromethyl-phenyl) triethoxysilane, [2-(4-chloromethyl-phenyl)-ethyl] trimethoxysilane, [2-(4-chloromethyl-phenyl)-ethyl] triethoxysilane, (3-chloro-propyl)-triethoxysilane, (3-chloro-propyl)-trimethoxysilane, (3-chloro-propenyl)-trimethoxysilane, (3-chloro-propenyl)-triethoxysilane, trimethoxy-(2-p-tolyl-ethyl)silane, triethoxy-(2-p-tolyl-ethyl) silane, and mixtures thereof; and (ii) a treating material selected from the group consisting of anionic, nonionic and amphoteric surfactants, and mixtures thereof, said treating material being present in an amount of from greater than 1% to 25% by weight of untreated filler, and (b) drying said treated filler slurry to produce treated filler.

* * * * *